3,363,163
**AUTOMATIC ON-OFF BATTERY
CHARGING SYSTEM**
Gordon L. Nord and Clifford A. Rowas, Cincinnati, Ohio, assignors to Schauer Manufacturing Corporation, Cincinnati, Ohio, a corporation of Ohio
Filed Feb. 7, 1966, Ser. No. 540,425
3 Claims. (Cl. 320—31)

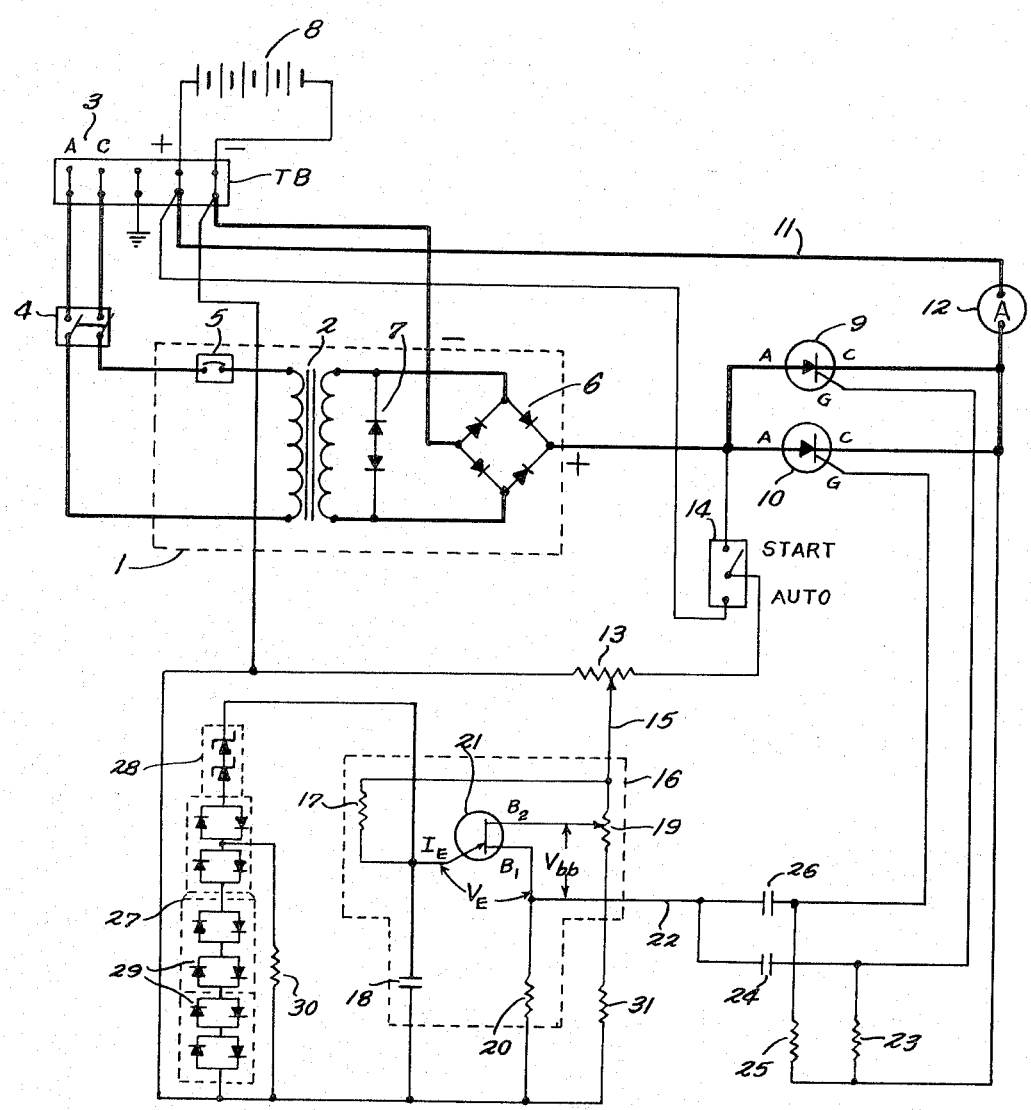

ABSTRACT OF THE DISCLOSURE

Circuitry that provides an automatic "off-on" SCR firing control for a battery charging system which maintains the system at full battery charging capacity whenever the battery voltage is below its fully charged condition.

---

This invention relates to battery chargers and is particularly directed to improvements in solid state, control circuits for battery charging systems, or the like.

An object of the invention is to provide a control circuit for battery charging systems that is fully temperature compensated to match the negative coefficient required by a battery subjected to varying ambient temperatures during the battery charging period.

Another object of the invention is to provide a solid state control circuit that with a few simple modifications can be used for charging systems having different output voltage ratings.

Further objects of this invention are to provide a control circuit for battery charging systems having the foregoing characteristics which is completely unaffected by dust or vibration, that cannot be damaged by inadvertent reversal of the output terminals when connecting the system to a battery; that will permit connection of the system to a battery for an indefinite time without injury to the battery; that can be left unattended while charging a battery; that may be used for both cycle and float charging applications; that will provide a constant output pulse to the battery for an A.C. input variation of ±10%; and wherein explosion hazard is non-existent because sparking at the battery terminals when making connections is eliminated.

These and further objects of this invention will be apparent from the following specification and the accompanying drawing, wherein there is shown an exemplary embodiment of our invention depicted as a single schematic diagram.

In the drawing the numeral 1 represents a conventional power supply for our battery charging system including a transformer 2 which functions to step down the source of alternating input voltage appearing across 3 on terminal block TB to that required for the charger circuit, a double pole, single throw switch 4 being connected across the leads of the alternating current source and one said lead having an automatic reset circuit breaker 5 interposed therein. A full wave rectifier 6 is connected to the ends of the secondary winding of the transformer 2, a transient suppressor 7 being provided to supress any transient which may appear across the full wave rectifier 6. The negative output side of the power supply is connected to the negative terminal of a battery 8 through terminal block TB, while the positive output side of the power supply is connected to the anode electrodes of a number of solid state, silicon controlled rectifiers 9 and 10. The cathode electrodes of the rectifiers are connected to the positive terminal of the battery 8 through terminal block TB by a line 11, said line having the usual ammeter 12 interposed therein. When the rectifiers are fired and break down they will each conduct a portion of the total current required for charging the battery at any time during its charging or hold periods, as will be more fully described hereinafter.

The control circuit for the battery charging system comprises a resistor 13 connected across the output of the power supply 1 when a single pole, double throw switch 14 is in its "start" position and is connected across the battery terminals when the switch 14 is in its "auto" position. The variable voltage tap of resistor 13 is connected by a line 15 to an oscillator circuit, generally indicated in the drawing by the numeral 16, and provides a preselected direct current input voltage to said oscillator circuit. By the use of this resistor the same control voltage can be used for battery charging systems with different nominal direct current output voltages.

The oscillator circuit 16 includes a first resistor 17, a capacitor 18, a potentiometer 19, a second resistor 20 and a unijunction transistor 21. The oscillator functions to generate firing pulses for the rectifiers 9 and 10; the gate circuits of said rectifiers being fired from a common pulse source developed across resistor 20 and transmitted from the oscillator through a line 22. Resistor 23 and capacitor 24 comprise an equalizing network for the rectifier 9 whilst resistor 25 and capacitor 26 serve as an equalizing network for the rectifier 10. These networks insure reliable firing of two or more parallel connected rectifier gates from the common pulse source.

Our control circuit also has a temperature compensator unit 27 which functions to adjust the emitter voltage of transitsor 21 and hence the direct current output voltage under charge in accordance with the required negative temperature coefficient required by the battery to compensate for varying ambient temperature conditions. This compensator comprises a zener diode string 28 wired in series with varistor assemblies 29 and a trimming resistor 30 shunting certain of the assemblies 29.

The operation of my control circuit will now be described in detail and it will be understood that the desired control voltage level to initiate the pulsed charging mode is set and controlled by the potentiometer 19, it being thought desirable to initiate a pulse mode of charging at a duty cycle beginning at a point when the battery reaches approximately 80–85% of full charge and continuing in the pulse charging mode at still a different duty cycle until the battery reaches full charge. At full battery charge no additional increase in specific gravity takes place. The final duty cycle is sufficiently low to allow the charger to remain connected to the battery indefinitely with negligible temperature rise of the battery electrolyte. The difference in pulsing rate or duty cycle for the 80–85% of full charge and full charge is sufficient to allow the ammeter 12 to provide a positive means of determining when the battery has reached its fully charged condition.

The charger control circuit consisting of zener diode string 28, varistor assemblies 29, resistors 17, 20, 30, 23 and 25, unijunction transistor 21, potentiometer 19, silicon controlled rectifiers 9 and 10, third resistor 31, and switch 14 are interconnected in a particular way to initiate the necessary charger control which provides an automatic current "on" and reduction of the charging rate as required by the battery to which the charger is connected. Resistor 13 is connected across the DC output of the charger and battery terminals and functions as a voltage divider to provide a particular DC input voltage to a part of the control circuit of the charger. By the use of the resistor 13 the same control voltage can be used on chargers with different nominal DC output voltages.

Resistor 17, capacitor 18, potentiometer 19, resistor 20 and transistor 21 comprise a relaxation oscillator circuit utilizing a unijunction type transistor. This oscillator is used to generate the firing pulses for the silicon controlled rectifiers 9 and 10. The gate circuits of the silicon controlled rectifiers are fired from a common pulse source developed across the resistor 20. Resistor 23 and capacitor 24 comprise an equalizing network for the silicon controlled rectifier 9. Resistor 25 and capacitor 26 comprise an equalizing network for the rectifier 10. These networks insure reliable firing of two or more parallel connected silicon controlled rectifier gates from a common pulse source.

Varistors 29 and resistor 30 comprise the temperature compensation network which functions to adjust the emitter voltage of transistor 21 and hence the DC output voltage under charge in accordance with the required negative temperature coefficient required by the battery to compensate for varying ambient temperature conditions.

Momentary switch 14 functions as a low battery "start" and an automatic operation selector switch. The low battery start position of the switch makes it possible to turn the charger on if the charger should be connected to a battery whose terminal voltage is less than the minimum required for series connection of the zener diode string 28 and the varistors 29. If this condition should exist at any time, it is only necessary to push the switch 14 momentarily to the "start" position and the charger will turn on immediately to start the charging process. Upon release of the switch by the operator the charger control is placed on "auto" operation whereupon the control circuit will control the entire charging process to completion or until the battery is disconnected from the charger.

The desired control voltage level to initiate the pulse charging mode is set by the potentiometer 19. The battery voltage under charge is sensed at the terminal block TB and applied across voltage divider resistor 13. The emitter voltage $V_E$ of the unijunction transistor 21 is used as a reference voltage for the charger control circuit and is held constant for any one given value of ambient temperature by the series connected circuit consisting of the zener diode string 28, the varistors 29 and the trimming resistor 30. The emitter voltage $V_E$ however is adjusted by the temperature compensation network consisting of the varistors 29 and the trim resistor 30 in the proper magnitude and direction as required by the battery as the ambient temperature varies.

When the charger is connected to a discharged battery the terminal voltage is lower than that of a fully charged battery and consequently the sensed voltage applied across the potentiometer 19 and the resistor 31 is lower. The interbase voltage $V_{bb}$ of the transistor 21 is lowered resulting in a lower peak point voltage $V_p$ of the transistor 21. The peak point voltage of the unijunction transistor 21 varies in proportion to the base voltage $V_{bb}$, according to the following equation:

$$V_p = nV_{bb} + V_d$$

where $n$ is called the intrinsic stand off ratio and $V_d$ is the equivalent emitter diode voltage. When the battery is discharged the emitter voltage $V_E$ is greater than $V_p$ and the emitter current $I_E$ is greater than the peak point current $I_p$. Therefore transistor 21 turns on and discharges the capacitor 18 through the emitter base B1 junction of the transistor 21. The flow of emitter current through the resistor 20 develops a pulse voltage, which is used as a common triggering voltage to turn on both of the silicon controlled rectifiers 9 and 10 allowing charging current to flow into the battery. This charger circuit will allow two or more silicon controlled rectifying devices to be parallel connected to increase the current rating of the charger.

If the load on the unijunction transistor trigger circuits consists of two or more silicon controlled rectifier gates in parallel, it is desirable to prevent a low resistance gate from loading the output of the trigger circuit to such an extent that the other silicon controlled rectifier may not trigger. To reduce this possibility the trigger pulse is coupled by a separate capacitor 24 and 26 in the silicon controlled rectifier gates 9 and 10, respectively. These capacitors actually equalize the charge coupled to each gate during the trigger pulse and thus tend to reduce the effects of unequal loading. In addition to the capacitors, resistors 23 and 25 are connected between the gates and cathodes of the silicon controlled rectifiers 9 and 10, respectively.

In the relaxation oscillator circuit consisting of the components mentioned above, the capacitor 18 is charged through the resistor 17 until the emitter voltage reaches the peak point voltage $V_p$ of the transistor 21, at which time the transistor 21 turns on and discharges the capacitor 18 through the resistor 20. When the emitter voltage $V_E$ reaches a value of about two (2) volts, the emitter ceases to conduct, the transistor 21 turns off and the cycle is repeated. This cyclic action generates the firing pulse for the silicon controlled rectifiers 9 and 10. The period of this pulse type oscillation is given by the following formula:

$$T = \frac{1}{f} = R_1 C_1 \ln \frac{1}{1-n} = 2.3 R_1 C_1 \log_{10} \frac{1}{1-n}$$

As the battery becomes charged its terminal voltage raises and consequently the sensed voltage applied across the potentiometer 19 and the resistor 31 is raised. The interbase voltage $V_{bb}$ of the transistor 21 is raised resulting in a higher peak point voltage $V_p$ of the transistor 21. When the peak point voltage $V_p$ reaches the magnitude of the emitter voltage $V_E$ the transistor 21 emitter will be reversed biased and the transistor 21 will turn off allowing only a small reverse leakage current $I_{EO}$ to flow. The magnitude of $I_{EO}$ is sufficiently low to prevent sufficient pulse voltage to be developed across the resistor 20 to fire the silicon controlled rectifiers 9 and 10 and they turn off removing the charging current to the battery. At this point the battery is 80–85% charged. Immediately upon removing the charging current to the battery the terminal voltage of the battery falls or lowers just sufficiently to turn the transistor 21 and the silicon controlled rectifiers 9 and 10 on again at a low duty cycle. The battery terminal voltage then rapidly builds up until the transistor 21 and the silicon controlled rectifiers 9 and 10 again turn off. The repetition of this cyclic event constitutes the charger pulse mode control and continues to raise the state of the charge of the battery from the 80–85% of charge which existed at the initial time of the control action up to 100% or full charge. Inasmuch as the sensed voltage is derived across the DC output of the charger or across the terminal voltage of the battery the relaxation oscillator control circuit of the charger completely shuts down or ceases to function should any one of the following conditions present itself across the plus and minus output terminals of the charger: (1) a bolted short circuit or (2) a battery connected to the charger in a reversed polarity manner.

While a preferred embodiment has been chosen to illustrate our invention it will be understood that it is subject to modifications without departing from the spirit and scope of the appended claims. It will be understood that in lieu of utilizing two silicon controlled rectifiers 9 and 10 in our circuitry we could employ a single rectifier or increase the number of rectifiers to more than two with appropriate changes being made in the equalizing network serving each rectifier by those skilled in the art.

What is claimed is:

1. In a storage battery charging system having input and output terminals, an electronic rectifier having an anode, a cathode and a gate electrode, the anode of the rectifier being connected to the positive input terminal of the system, and the cathode of the rectifier being connected to the positive output terminal of the system; a voltage sensing circuit connected across the output terminals of the system; an oscillating control circuit for said system including a unijunction transistor having a first and a second base and an emitter electrode; a potentiometer and first, second and third resistors; the potentiometer and the first, resistor being connected together and to the voltage sensing circuit; the opposed end of the first resistor being coupled to the emitter electrode; the second and third resistors being series connected between the opposite side of the potentiometer and to the first base of the transistor; the second base of the transistor being connected to the variable arm of the potentiometer; means connecting the gate electrode of the rectifier to the first base of the transistor; and a voltage regulating diode coupled to the emitter electrode of the transistor and connected to the negative output terminal of the battery charging system.

2. In a storage battery charging system according to claim 1 wherein the voltage sensing circuit includes a variable resistor; and the potentiometer and the first resistor are connected to the variable arm of the resistor.

3. In a storage battery charging system according to claim 1 wherein a varistor string is series coupled between the negative output terminal of the battery charging system and the diode.

References Cited

UNITED STATES PATENTS

| | | | |
|---|---|---|---|
| 3,106,665 | 10/1963 | Byles | 317—100 |
| 3,160,805 | 12/1964 | Lawson | 320—39 |
| 3,300,704 | 1/1967 | McMillen | 320—61 |
| 3,310,729 | 3/1967 | Burgess et al. | 321—18 |

OTHER REFERENCES

General Electric, SCR Manual, 1961, p. 49.

JOHN F. COUCH, *Primary Examiner.*

S. WEINBERG, *Assistant Examiner.*